(12) United States Patent
Miyamoto et al.

(10) Patent No.: US 7,276,303 B2
(45) Date of Patent: Oct. 2, 2007

(54) DIRECT METHANOL FUEL CELL SYSTEM, PORTABLE ELECTRONIC APPLIANCE, AND METHOD OF DETECTING AN AMOUNT OF LIQUID FUEL REMAINING IN DIRECT METHANOL TYPE FUEL CELL SYSTEM

(75) Inventors: Hirohisa Miyamoto, Kamakura (JP); Norihiro Tomimatsu, Kawasaki (JP); Nobuo Shibuya, Hiratsuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 623 days.

(21) Appl. No.: 10/742,823

(22) Filed: Dec. 23, 2003

(65) Prior Publication Data

US 2004/0185314 A1 Sep. 23, 2004

(30) Foreign Application Priority Data

Dec. 26, 2002 (JP) ............................. 2002-377053

(51) Int. Cl.
*H01M 8/04* (2006.01)
(52) U.S. Cl. .......................................... 429/13; 429/22
(58) Field of Classification Search ...................... None
See application file for complete search history.

(56) References Cited

U.S. PATENT DOCUMENTS 4,629,664 A * 12/1986 Tsukui et al. .................. 429/23

FOREIGN PATENT DOCUMENTS

| JP | 61-47072 | 3/1986 |
| JP | 5-258760 | 10/1993 |
| JP | 2001-93551 | 4/2001 |
| JP | 2002-289211 | 10/2002 |
| JP | 2004-152617 | 5/2004 |

OTHER PUBLICATIONS

Certified translation of JP 61-47072, Mar. 1986.*

* cited by examiner

*Primary Examiner*—Jonathan Crepeau
(74) *Attorney, Agent, or Firm*—Oblon, Spivak, McClelland, Maier & Neustadt, P.C.

(57) ABSTRACT

The invention provides a direct methanol fuel cell system comprising a fuel cell main body comprising an anode, a cathode, an electrolyte membrane provided between the anode and the cathode, and a feed tank containing a methanol-containing liquid fuel to be fed to the anode, a first liquid fuel storage tank which contains a methanol-containing liquid fuel to be supplied into the feed tank, a second liquid fuel storage tank which contains a methanol-containing liquid fuel to be supplied into the first liquid fuel storage tank, and a liquid level change detecting mechanism which detects changes in the level of the liquid fuel stored in the first liquid fuel storage tank.

4 Claims, 2 Drawing Sheets

DIRECT METHANOL FUEL CELL SYSTEM, PORTABLE ELECTRONIC APPLIANCE, AND METHOD OF DETECTING AN AMOUNT OF LIQUID FUEL REMAINING IN DIRECT METHANOL TYPE FUEL CELL SYSTEM

CROSS-REFERENCE TO RELATED APPLICATIONS

This application is based upon and claims the benefit of priority from the prior Japanese Patent Application No. 2002-377053, filed Dec. 26, 2002, the entire contents of which are incorporated herein by reference.

BACKGROUND OF THE INVENTION

1. Field of the Invention

The present invention relates to a direct methanol fuel cell system, a portable electronic appliance having this direct methanol fuel cell system, and a method of detecting an amount of liquid fuel remaining in the direct methanol type fuel cell system.

2. Description of the Related Art

Recently, there is an increasing expectation toward the fuel cell as the power supply of portable electronic appliances supporting the electronic society, or as the power supply for preventing air pollution or global warming.

Among fuel cells, the direct methanol fuel cell (DMFC) for generating power by taking out protons directly from methanol is highly expected to be used in various applications, including the use in portable electronic appliances because a reformer is not needed and the required fuel volume is small.

As disclosed in Jpn. Pat. Appln. KOKAI Publication No. 2001-93551, the liquid fuel container of the direct methanol fuel cell is realized as a detachable container or a liquid fuel refilling container, and therefore the fuel cell is reduced in size and the driving time is extended.

When the direct methanol fuel cell disclosed in this publication is used as the power supply for a portable electronic appliance such as a portable personal computer, as the remaining level decreases in the liquid fuel container, it requires a mechanism for transferring the operation of the electronic appliance to a wait operation, and turning off the power without damaging a hard disk such as a memory incorporated in the portable electronic appliance. The remaining level required for the wait operation is usually about several cubic centimeters although varies depending on the type of the electronic appliance.

For detection of the remaining level, for example, a liquid level sensor using an optical technique is used. However, since the measuring precision is low for the amount of several cubic centimeters, normal operation may be continued without transferring to a wait operation in spite of the shortage of remaining level, and the power generation of the fuel cell may be stopped due to consumption of liquid fuel, so that the electronic appliance may be damaged.

BRIEF SUMMARY OF THE INVENTION

It is hence an object of the invention to provide a direct methanol fuel cell system capable of detecting the remaining amount of liquid fuel with high precision, and a portable electronic appliance having this direct methanol fuel cell system.

It is also an object of the invention to provide a method of detecting the amount of liquid fuel remaining in the direct methanol type fuel cell system with high precision.

According to a first aspect of the present invention, there is provided a direct methanol fuel cell system comprising:

a fuel cell main body comprising an anode, a cathode, an electrolyte membrane provided between the anode and the cathode, and a feed tank containing a methanol-containing liquid fuel to be fed to the anode;

a first liquid fuel storage tank which contains a methanol-containing liquid fuel to be supplied into the feed tank;

a second liquid fuel storage tank which contains a methanol-containing liquid fuel to be supplied into the first liquid fuel storage tank; and a liquid level change detecting mechanism which detects changes in the level of the liquid fuel stored in the first liquid fuel storage tank.

According to a second aspect of the present invention, there is provided a direct methanol fuel cell system comprising:

a fuel cell main body comprising an anode, a cathode, an electrolyte membrane provided between the anode and the cathode, and a feed tank containing a methanol-containing liquid fuel to be fed to the anode;

a storage tank comprising a first liquid fuel storage section which contains a methanol-containing liquid fuel to be supplied into the feed tank, and a second liquid fuel storage section which contains a methanol-containing liquid fuel to be supplied into the first liquid fuel storage section; and a liquid level change detecting mechanism which detects changes in the level of the liquid fuel stored in the first liquid fuel storage section.

According to a third aspect of the present invention, there is provided a portable electronic appliance comprising a direct methanol fuel cell system, wherein the direct methanol fuel cell system comprises:

a fuel cell main body comprising an anode, a cathode, an electrolyte membrane provided between the anode and the cathode, and a feed tank containing a methanol-containing liquid fuel to be fed to the anode;

a first liquid fuel storage tank which contains a methanol-containing liquid fuel to be supplied into the feed tank;

a second liquid fuel storage tank which contains a methanol-containing liquid fuel to be supplied into the first liquid fuel storage tank; and a liquid level change detecting mechanism which detects changes in the level of the liquid fuel stored in the first liquid fuel storage tank.

According to a fourth aspect of the present invention, there is provided a portable electronic appliance comprising a direct methanol fuel cell system, wherein the direct methanol fuel cell system comprises:

a fuel cell main body comprising an anode, a cathode, an electrolyte membrane provided between the anode and the cathode, and a feed tank containing a methanol-containing liquid fuel to be fed to the anode;

a storage tank comprising a first liquid fuel storage section which contains a methanol-containing liquid fuel to be supplied into the feed tank, and a second liquid fuel storage section which contains a methanol-containing liquid fuel to be supplied into the first liquid fuel storage section; and a liquid level change detecting mechanism which detects changes in the level of the liquid fuel stored in the first liquid fuel storage section.

According to a fifth aspect of the present invention, there is provided a method of detecting an amount of liquid fuel remaining in a direct methanol fuel cell system that comprises a fuel cell main body comprising an anode, a cathode, an electrolyte membrane provided between the anode and the cathode, and a feed tank containing a methanol-containing liquid fuel to be fed to the anode, the direct methanol fuel cell system further comprising a first liquid fuel storage tank which contains a methanol-containing liquid fuel to be supplied into the feed tank, and a second liquid fuel storage tank which contains a methanol-containing liquid fuel to be supplied into the first liquid fuel storage tank, the method comprising:

detecting an amount of the liquid fuel stored in the second liquid fuel storage tank, from changes in the level of the liquid fuel stored in the first liquid fuel storage tank.

DETAILED DESCRIPTION OF THE INVENTION

Figure 1:
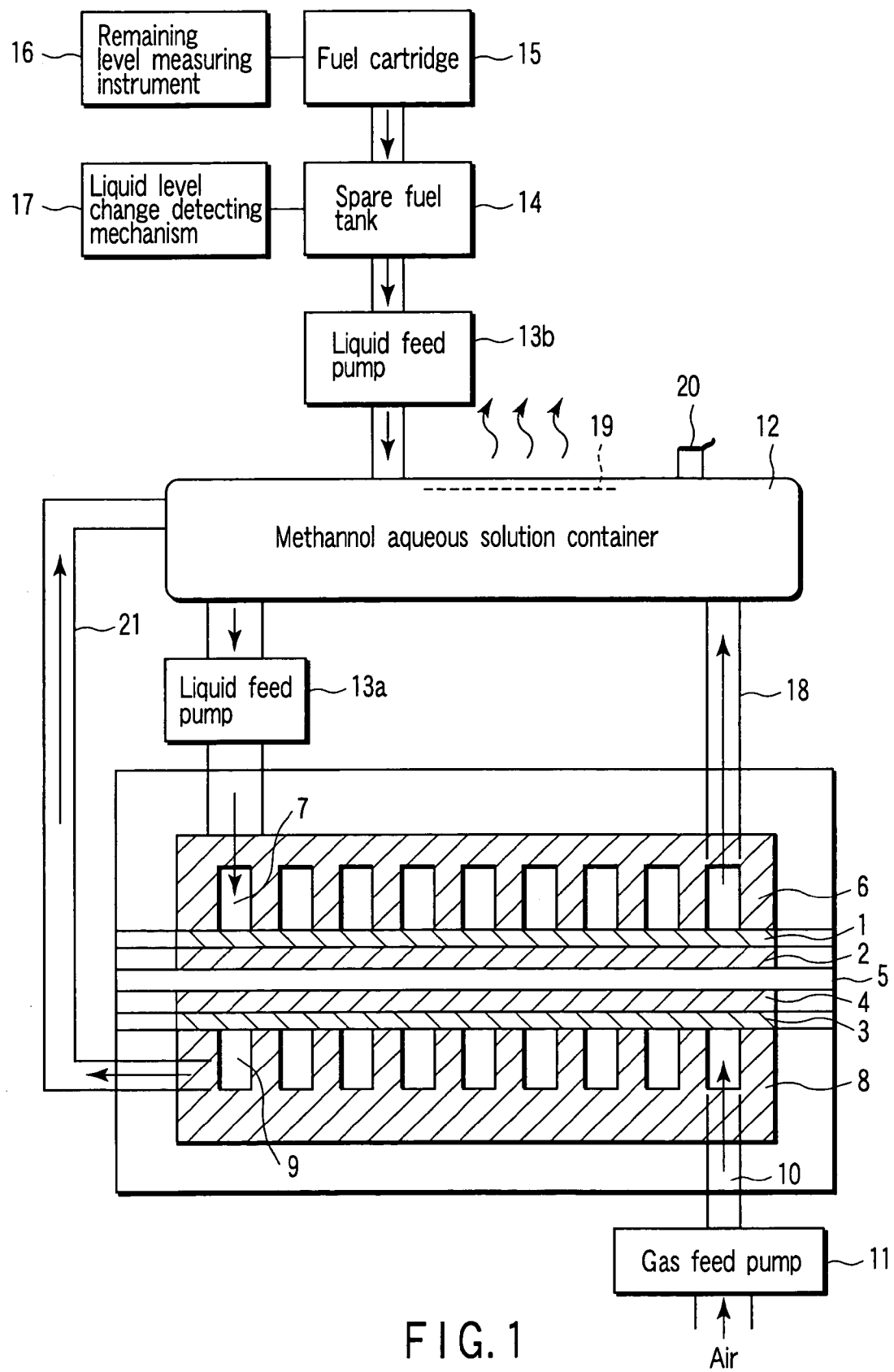
FIG. 1 is a schematic view showing a first embodiment of a direct methanol fuel cell (DMFC) system according to the invention.

First and second direct methanol fuel cell systems of the invention, and a method of detecting a remaining level of liquid fuel of the direct methanol fuel cell system will be explained.

Portable electronic appliances in which the first and second direct methanol fuel cell systems are mounted include, for example, a portable personal computer (PC), a personal digital assistant (PDA), a cellphone, a portable digital television, a video camera, and a digital style camera.

The first direct methanol fuel cell system according to the invention comprises:

a fuel cell main body comprising an anode, a cathode, an electrolyte membrane provided between the anode and the cathode, and a feed tank containing a methanol-containing liquid fuel to be fed to the anode;

a first liquid fuel storage tank which contains a methanol-containing liquid fuel to be supplied into the feed tank;

a second liquid fuel storage tank which contains a methanol-containing liquid fuel to be supplied into the first liquid fuel storage tank; and a liquid level change detecting mechanism which detects changes in the level of the liquid fuel stored in the first liquid fuel storage tank.

The second liquid fuel storage tank may be attachable/detachable and exchanged with a new tank, or may be designed to be refilled with liquid fuel from outside without being detached, but the attachable/detachable type is preferred in consideration of safety.

The second direct methanol fuel cell system according to the invention comprises:

a fuel cell main body comprising an anode, a cathode, an electrolyte membrane provided between the anode and the cathode, and a feed tank containing a methanol-containing liquid fuel to be fed to the anode;

a storage tank comprising a first liquid fuel storage section which contains a methanol-containing liquid fuel to be supplied into the feed tank, and a second liquid fuel storage section which contains a methanol-containing liquid fuel to be supplied into the first liquid fuel storage section; and a liquid level change detecting mechanism which detects changes in the level of the liquid fuel stored in the first liquid fuel storage section.

The storage tank may be attachable/detachable and exchanged with a new tank, or may be designed to be refilled with liquid fuel from outside without being detached, but the attachable/detachable type is preferred in consideration of safety.

In the first direct methanol fuel cell system according to the invention, by detecting the liquid level changes of the first liquid fuel storage tank by the liquid level change detecting mechanism, it is determined whether or not the liquid fuel remaining level in the second liquid fuel storage tank is a set value or less.

That is, in the first fuel cell system of the invention, when the first liquid fuel storage tank refills the feed tank with the liquid fuel, the fuel amount in the first liquid fuel storage tank decreases. However, since the liquid fuel is supplied from the second liquid fuel storage tank into the first liquid fuel storage tank, the liquid amount in the first liquid fuel storage tank can be maintained at the set value or more.

When the fuel amount in the second liquid fuel storage tank is in shortage, the decrement by refill from the first liquid fuel storage tank to the feed tank cannot be compensated by the second liquid fuel storage tank, so that the liquid level in the first liquid fuel storage tank becomes less than the set value. At this time, by changing over the operation of the portable electronic appliance to the wait operation, the operation can be securely transferred to the wait operation even if the device for measuring the remaining level in the second liquid fuel storage tank malfunctions. The set liquid level in the first liquid fuel storage tank is preferred to be set at the minimum fuel amount necessary for wait operation of the portable electronic appliance or a higher level. The minimum fuel amount varies with the type of the appliance.

In the first fuel cell system, by setting the first liquid fuel storage tank to be attachable to/detachable from the fuel cell main body, the capacity of the first liquid fuel storage tank can be changed freely depending on the type of the appliance to which the power is supplied.

In the first fuel cell system, the methanol concentration of the liquid fuel stored in either liquid fuel storage tank may be equal to or higher than that of the liquid fuel stored in the feed tank.

In the second direct methanol fuel cell system of the invention, by detecting the liquid level changes of the first liquid fuel storage section by the liquid level change detecting mechanism, it is determined whether or not the liquid fuel remaining level in the second liquid fuel storage section is a set value or less.

That is, in the second fuel cell system of the invention, when the first liquid fuel storage section refills the feed tank with the liquid fuel, the fuel amount in the first liquid fuel storage section decreases. However, since the liquid fuel is supplied from the second liquid fuel storage section into the first liquid fuel storage section, the liquid amount in the first liquid fuel storage section can be maintained at the set value or more.

When the fuel amount in the second liquid fuel storage section is in shortage, the decrement by refill from the first liquid fuel storage section to the feed tank cannot be compensated by the second liquid fuel storage section, so that the liquid level in the first liquid fuel storage section becomes less than the specified value. At this time, by changing over the operation of the portable electronic appliance to the wait operation, the operation can be securely transferred to the wait operation even if the device for measuring the remaining level in the second liquid fuel storage section malfunctions. The set liquid level in the first liquid fuel storage section is preferred to be set at the minimum fuel amount necessary for wait operation of the portable electronic appliance or a higher level. The minimum fuel amount varies with the type of the appliance.

In the second fuel cell system, the methanol concentration of the liquid fuel stored in either liquid fuel storage section may be equal to or higher than that of the liquid fuel stored in the feed tank.

In the first and second fuel cell systems, the liquid level change detecting mechanism is not particularly limited, and the detecting mechanism can make use of any change, such as dielectric constant change, refractive index change, conductivity or resistance change, or light permeability change. In particular, it is preferred to use a binary sensor as the liquid level change detecting mechanism. If the fuel is slightly decreased in the first liquid fuel storage tank and first liquid fuel storage section, the appliance must be immediately transferred to the wait operation. Therefore, in the stationary state, the liquid must be kept at full level in the first liquid fuel storage tank and first liquid fuel storage section, and it is preferred to transferred to the wait operation immediately when the liquid fuel in the first liquid fuel storage tank and first liquid fuel storage section is consumed and is no longer at full level. From such viewpoint, the liquid level change detecting mechanism provided in the tank is preferred to be a binary sensor capable of determining two values, whether full or not.

The feed tank, first liquid fuel storage tank, second liquid fuel storage tank, first liquid fuel storage section, and second liquid fuel storage section are preferred to be formed of materials excellent in chemical resistance (corrosion resistance), for example, metals such as stainless steel (SUS304, SUS316, etc.), titanium or aluminum; thermoplastic resins such as fluoroplastics (PTFE, etc.), rigid vinyl chloride resin, polyethylene, polypropylene, polycarbonate, methyl pentene resin or polyurethane; thermosetting resins such as melamine; and rubbers such as butadiene rubber, styrene rubber, butyl rubber, ethylene-propylene rubber, natural rubber, or fluororubber (FKM, FPM, etc.). Among these materials, stainless steel, fluoroplastics, polypropylene, polycarbonate, butadiene rubber, styrene rubber, butyl rubber, ethylene-propylene rubber, and natural rubber are particularly preferred.

Examples of the first and second direct methanol fuel cell systems according to the invention will be described below while referring to FIGS. 1 and 2.

FIG. 1 is a schematic view showing a first embodiment of the direct methanol fuel cell (DMFC) system of the invention. FIG. 2 is a flowchart explaining an example of a method of operating the direct methanol fuel cell system in FIG. 1.

The fuel cell main body of this direct methanol fuel cell (DMFC) system comprises a power generating unit, an anode fluid channel plate 6, a cathode fluid channel plate 8, and a methanol aqueous solution container 12. The power generating unit includes an anode having an anode current collector (for example, anode carbon paper) 1 and an anode catalyst layer 2, a cathode having a cathode current collector 3 and a cathode catalyst layer 4, and an electrolyte membrane 5, for example, Nafion film having high proton conductivity arranged between the anode and the cathode. The catalyst used in the anode catalyst layer 2 is, for example, PtRu small in poisoning. The anode catalyst layer 2 varies in methanol concentration depending on its thickness, and the methanol concentration is lower as the thickness is smaller. The thickness of the anode catalyst layer 2 is preferred to be 40 microns or more, preferably 40 to 150 microns. By defining the porosity (Nafion content $\epsilon$) of the anode catalyst layer 2 in a range of 0.4 to 0.7, the diffusion speed of the methanol aqueous solution can be enhanced. On the other hand, the catalyst used in the cathode catalyst layer 4 is, for example, Pt.

The anode fluid channel plate 6 is arranged at the side of the anode current collector 1. The anode fluid channel plate 6 is formed as a meandering groove anode fluid channel 7 having a methanol feed port at one end and a methanol discharge port at the other end. On the other hand, the cathode fluid channel plate 8 is arranged at the side of the cathode current collector 3 of the power generating unit. This cathode fluid channel plate 8 is formed as a meandering groove anode fluid channel 9 having an oxidizer feed port at one end and an oxidizer discharge port at the other end. At the oxidizer feed port, an air feed pump 11 is connected by way of an air feed pipe 10. By this air feed pump 11, an oxidizer, for example, air is supplied into the oxidizer feed port from outside.

The methanol aqueous solution container 12 for containing a methanol aqueous solution therein is connected to the methanol feed port of the anode fluid channel 7 by way of a liquid feed pump 13a. A spare fuel tank 14 is connected to the methanol aqueous solution container 12 by way of a liquid feed pump 13b. A fuel cartridge 15 is connected to the spare fuel tank 14. The fuel cartridge 15 contains a methanol aqueous solution at high concentration (for example, 98%). The methanol concentration of the liquid fuel stored in each of the spare fuel tank 14 and the fuel cartridge 15 is higher than the methanol concentration of the liquid fuel stored in the methanol aqueous solution container 12. A remaining level measuring instrument 16 is connected to the fuel cartridge 15. This remaining level measuring instrument 16 measures the remaining level of the methanol aqueous solution in the cartridge 15, and when the measuring result showing minimum fuel amount for compensating necessary electric power for transferring the appliance to a safe wait state is obtained, it transmits this result of measurement as a signal to the microcomputer which controls power supply of the appliance. The minimum required fuel amount for transferring the portable electronic appliance to a safe wait state is desired to be varied depending on the appliance to which the electric power is supplied. For example, when a TOSHIBA Libretto is used as the portable personal computer (PC), the minimum fuel amount is preferred to be 5 cc. The remaining level measuring instrument 16 may be realized by a detecting mechanism making use of any one of dielectric constant change, refractive index change, conductivity or resistance change, or light permeability change. In particular, it is preferred to make use of resistance change. This is because, when the power supply is managed, the remaining amount can be controlled by the resistance change.

Figure 2:
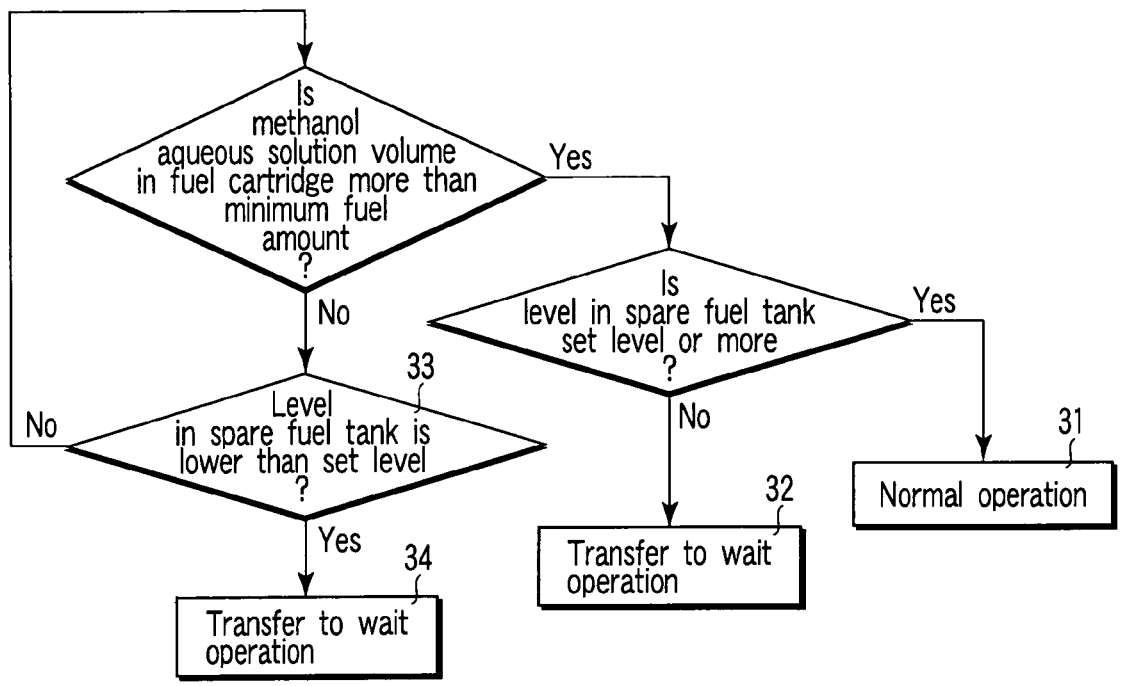
FIG. 2 is a flowchart explaining an example of a method of operating the direct methanol fuel cell system in FIG. 1.

When the power supply management microcomputer receives a signal of the measurement result of liquid level in the fuel cartridge, it is immediately determined whether the liquid level in the spare fuel tank 14 is full or not (step 33 in FIG. 2).

That is, the spare fuel tank 14 contains a methanol aqueous solution at high concentration (for example, 98%). The amount of methanol aqueous solution in the spare fuel tank 14 should be at least the minimum required fuel amount for compensating necessary electric power to transfer the appliance to a safe wait state. The spare fuel tank 14 has a liquid level change detecting mechanism 17 (for example, binary sensor) for detecting when the liquid level in the tank 14 becomes lower than the set level. In this embodiment, the set level is equal to the minimum fuel amount. Specifically, the inner volume of the spare fuel tank 14 is equal to the minimum fuel amount, and a binary sensor is attached in the upper wall of the spare fuel tank 14. The binary sensor is not activated when the methanol aqueous solution in the spare fuel tank 14 is at full level, and a signal for re-measurement by the remaining level measuring instrument 16 can be transmitted to the power supply management microcomputer. On the other hand, when the methanol aqueous solution in the spare fuel tank 14 is decreased, the liquid level in the tank changes, so that the binary sensor is activated. As a result, a signal is immediately transmitted to the power supply management microcomputer to transfer to wait operation, and the portable electronic appliance is transfer from normal operation to wait operation (step 34 in FIG. 2).

A fuel pipe 18 has one end connected to the methanol aqueous solution container 12, and the other end connected to the methanol discharge port of the anode fluid channel 7. A gas-liquid separator 19 is provided on the top of the methanol aqueous solution container 12. This gas-liquid separator 19 is formed of, for example, water repellent woven cloth or nonwoven cloth or other water repellent porous material. A gas pressure regulating valve 20 for adjusting the pressure in the methanol aqueous solution container 12 is arranged near the gas-liquid separator 19, and the gas exhaust port of the valve 20 faces outside. On the other hand, an exhaust pipe 21 has one end connected to the methanol aqueous solution container 12, and the other end connected to the methanol discharge port of the cathode fluid channel 9.

In the DMFC system having such configuration, the liquid feed pump 13a and the gas feed pump 11 are operated by an auxiliary battery. As a result, the methanol aqueous solution in the methanol aqueous solution container 12 is supplied into the anode fluid channel 7 via the methanol feed port. A convex portion (anode fluid channel non-forming region) of the anode fluid channel plate 6 contacts with the anode current collector 1, and the methanol aqueous solution flowing in the anode fluid channel 7 permeates into the anode current collector 1, so that the methanol aqueous solution is supplied into the anode catalyst layer 2.

The air taken in from the oxidizer feed port from the gas feed pump 11 through the gas feed pipe 10 flows in the cathode fluid channel 9 of the cathode fluid channel plate 8, and passes through the cathode catalyst layer 4.

When the methanol aqueous solution is supplied into the anode catalyst layer 2, protons are generated by catalytic reaction, and the generated protons pass through the electrolyte membrane 5 and react with the oxygen supplied in the cathode catalyst layer 4 on the catalyst, and thereby electric power is generated.

All of the supplied methanol aqueous solution is not permeated into the anode current collector 1, but the residual methanol aqueous solution is discharged from the methanol discharge port, and returned to the methanol aqueous solution container 12 by way of the fuel pipe 18. At this time, the carbon dioxide generated by reaction is also contained in the methanol aqueous solution container 12. The air left over in the cathode catalyst layer 4 is discharged from the oxidizer discharge port, and put into the methanol aqueous solution container 12 by way of the exhaust pipe 21. At this time, the water generated by power generation reaction and the steam vaporized by reaction heat are also put into the methanol aqueous solution container 12.

Thus, the air, carbon dioxide, steam, and other gas mixed in the methanol aqueous solution container 12 are once diffused in the methanol aqueous solution, and separated from the methanol aqueous solution by the gas-liquid separator 19, and released to outside through the gas-liquid separator 19. The gas pressure regulating valve 20 is activated when the internal pressure in the methanol aqueous solution container 12 is elevated.

Along with progress of power generation, when the methanol concentration in the container 12 is lowered due to an unreacted methanol aqueous solution returned from the fuel pipe 18 or water from the exhaust pipe 21, the liquid feed pump 13b is operated and the methanol aqueous solution is supplied from the spare fuel tank 14 into the container 12. Therefore, the methanol concentration in the container 12 can be maintained at a specified value. Simultaneously with solution supply from the spare fuel tank 14 into the container 12, the methanol aqueous solution is supplied into the spare fuel tank 14 from the fuel cartridge 15, so that the methanol aqueous solution amount in the spare fuel tank 14 can be maintained at the full level.

After solution supply from the fuel cartridge 15 into the spare fuel tank 14, the remaining level in the fuel cartridge 15 is measured by the remaining level measuring instrument 16. When the result of measurement shows the level is more than the minimum fuel amount, this signal is transmitted to the power supply management microcomputer. As a result, it is detected by the binary sensor, but since the fuel in the spare fuel tank 14 is at full level, the binary sensor is not activated, and the portable electronic appliance continues normal operation as shown in step 31 in FIG. 2. At this time, even if the remaining level measuring instrument 16 malfunctions, and a wrong signal showing that the fuel remaining level in the fuel cartridge 15 is at minimum fuel amount is transmitted to the power supply management microcomputer, since the binary sensor of the spare fuel tank 14 is not activated, the portable electronic appliance continues normal operation. When the binary sensor is not activated, a signal for re-measurement by the remaining level measuring instrument 16 is transmitted to the power supply management microcomputer, so that the remaining amount of fuel in the storage cartridge 15 is measured again. As a result of re-measurement, when the level is more than the minimum fuel amount and the binary sensor is not activated, a signal for re-measurement by the remaining level measuring instrument 16 is transmitted again to the power supply management microcomputer. This signal for re-measurement by the remaining level measuring instrument 16 is transmitted repeatedly until the binary sensor is activated.

As the power generation continues, when the remaining level of methanol aqueous solution in the fuel cartridge 15 decreases, the refill amount to the spare fuel tank 14 decreases, and therefore the fuel in the spare fuel tank 14 is no longer at full level. In this case, the remaining level measuring instrument 16 detects that the remaining level in the fuel cartridge 15 is lowered to minimum fuel amount, and this signal is sent to the power supply management microcomputer, so that the binary sensor is turned on and the binary sensor is activated. As a result, a signal is transmitted to the power supply management microcomputer to transfer to wait operation immediately, and the portable electronic appliance is transferred from normal operation to wait operation (step 34 in FIG. 2). Even if the remaining level measuring instrument 16 malfunctions to show the fuel remaining amount in the fuel cartridge 15 is more than the minimum fuel amount, since the binary sensor of the spare fuel tank 14 is activated, the portable electronic appliance is smoothly transferred to wait operation (step 32 in FIG. 2).

In FIG. 1, a single cell is used as example of DMFC power generating section, but a stack structure formed by connecting a plurality of single cells in parallel or series may be also used as the power generating section.

In FIG. 1, only the fuel cartridge 15 is attachable/detachable, but the spare fuel tank 14 may be also designed to be attachable/detachable. In this case, the capacity of the spare fuel tank 14 may be freely varied depending on the energy required for wait operation of the appliance. Or only a spare fuel tank may be incorporated in the portable electronic appliance.

Figure 3:
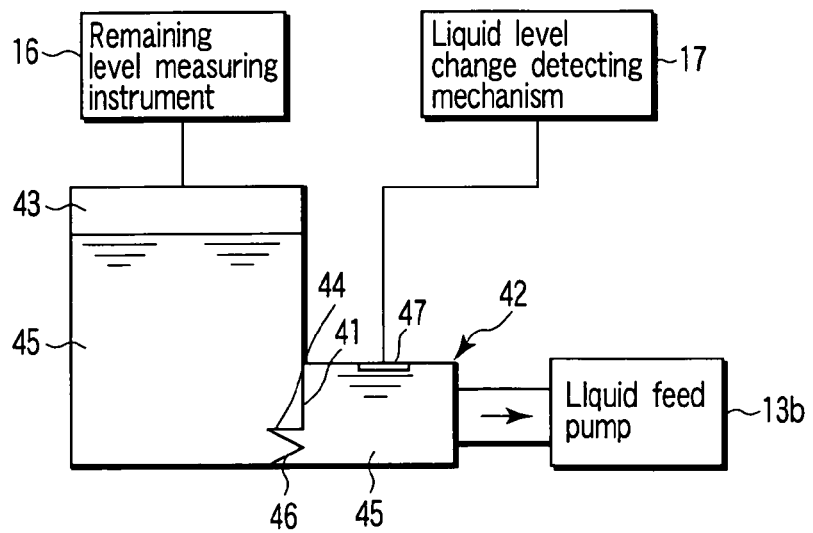
FIG. 3 is a schematic view showing essential parts of a second embodiment of the direct methanol fuel cell (DMFC) system according to the invention.

In FIG. 1, the spare fuel tank 14 is independent from the fuel cartridge 15, but the spare fuel tank 14 and fuel cartridge 15 may be integrated and used as storage tank, and this storage tank may be detachably fitted to the feed tank of the fuel cell main body. This example is shown in FIG. 3. In FIG. 3, same parts as shown in FIG. 1 are identified with the same reference numerals and detailed description is omitted.

The storage tank has a partition board 41 near the center, and one space functions as a first storage section 42, and other space functions as a second storage section 43. The first storage section 42 and second storage section 43 communicate with each other by way of a fluid channel 44 provided near the bottom, and a check valve 46 is installed to prevent counterflow of fuel from the first storage section 42 to the second storage section 43. The first storage section 42 of the storage tank is connected to the liquid feed pump 13b. A binary sensor 47 is buried in the top of the first storage section 42. Methanol aqueous solution 45 is stored in the first storage section 42 and the second storage section 43. The methanol concentration of the methanol aqueous solution 45 is higher than that of the methanol aqueous solution in the container 12.

While the volume of methanol aqueous solution 45 in the second storage section 43 is more than the minimum fuel amount, when methanol aqueous solution 45 is supplied into the methanol aqueous solution container 12 from the first storage section 42 by way of the liquid feed pump 13b, the methanol aqueous solution 45 is replenished from the second storage section 43 into the first storage section 42, and the replenished amount is equivalent to the loss amount due to supply. As a result, the methanol aqueous solution 45 in the first storage section 42 is maintained at the full level, and the binary sensor 47 is not activated and normal operation continues.

As the power generation continues, when the amount of methanol aqueous solution 45 in the second storage section 43 decreases and is lowered to the minimum fuel amount, the refill amount from the second storage section 43 to the first storage section 42 decreases, and the methanol aqueous solution 45 in the first storage section 42 is consumed and is no longer at full level. Therefore the remaining level measuring instrument 16 detects that the remaining level is lowered to minimum fuel amount, and the binary sensor is activated. As a result, the power supply management microcomputer transmits a signal to start to transfer to wait operation, and the portable electronic appliance is transferred from normal operation to wait operation.

Although the volume of methanol aqueous solution 45 in the second storage section 43 is decreased to reach the minimum fuel amount, if the remaining level measuring instrument 16 malfunctions and misjudges that the level is more than the minimum fuel amount, although signal is not transmitted to the power supply management microcomputer, the refill amount from the second storage section 43 decreases and the methanol aqueous solution 45 in the first storage section 42 is consumed and is no longer at full level. As a result, since the binary sensor is activated, the power supply management microcomputer transmits a signal to start to transfer to wait operation, and the portable electronic appliance is transferred from normal operation to wait operation.

As described herein, the invention provides a direct methanol fuel cell system capable of detecting the remaining amount of liquid fuel with high precision, and a portable electronic appliance having this direct methanol fuel cell system. The invention also provides a method of detecting the amount of liquid fuel remaining in the direct methanol type fuel cell system with high precision.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of detecting an amount of liquid fuel remaining in a direct methanol fuel cell system, comprising: a fuel cell main body comprising an anode, a cathode, an electrolyte membrane provided between the anode and the cathode, and a feed tank containing a methanol-containing liquid fuel to be fed to the anode; a first liquid fuel storage tank which contains a methanol-containing liquid fuel having a higher methanol concentration than a methanol concentration of the methanol-containing liquid fuel contained in the feed tank; a second liquid fuel storage tank which is connected to the first liquid fuel storage tank and contains a methanol-containing liquid fuel having a higher methanol concentration than a methanol concentration of the methanol-containing liquid fuel contained in the feed tank; a pump provided between the first liquid fuel storage tank and the feed tank; and a liquid level change detecting mechanism which detects changes in the level of the methanol-containing liquid fuel stored in the first liquid fuel storage tank, said method comprising:
determining that the methanol-containing liquid fuel is insufficient in the second liquid fuel storage tank, from changes in the methanol-containing level of the liquid fuel stored in the first liquid fuel storage tank.

2. A method of detecting an amount of liquid fuel according to claim 1, wherein said determining is performed after the methanol-containing liquid fuel is supplied from the second liquid fuel storage tank into the first liquid fuel storage tank.

3. A method of detecting an amount of liquid fuel according to claim 2, wherein it is determined that the liquid fuel is insufficient in the second liquid fuel tank, when the surface of the liquid fuel stored in the first liquid fuel tank falls to a set level.

4. A method of detecting an amount of liquid fuel remaining in a direct methanol fuel cell system, the system comprising: a fuel cell main body comprising an anode, a cathode, an electrolyte membrane provided between the anode and the cathode, and a feed tank containing a methanol-containing liquid fuel to be fed to the anode; a storage tank comprising a first liquid fuel storage section and a second liquid fuel storage section which communicates with the first liquid fuel storage section, and the first liquid fuel storage section and second liquid fuel storage section contain a methanol-containing liquid fuel having a higher methanol concentration than a methanol concentration of the methanol-containing liquid fuel contained in the feed tank; a pump provided between the first liquid fuel storage section and the feed tank; and a liquid level change detecting mechanism which detects changes in the level of the methanol-containing liquid fuel stored in the first liquid fuel storage section, said method comprising:

determining that the methanol-containing liquid fuel is insufficient in the second liquid fuel storage section, from changes in the level of the methanol-containing liquid fuel stored in the first liquid fuel storage section.

* * * * *